(12) United States Patent
Horie et al.

(10) Patent No.: US 7,508,689 B2
(45) Date of Patent: Mar. 24, 2009

(54) INVERTER AND A DRIVE SYSTEM USING THE INVERTER

(75) Inventors: Hideaki Horie, Yokosuka (JP); Takaaki Abe, Yokohama (JP); Takamitsu Saito, Yokohama (JP); Osamu Shimamura, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 304 days.

(21) Appl. No.: 11/133,331

(22) Filed: May 20, 2005

(65) Prior Publication Data

US 2005/0264267 A1   Dec. 1, 2005

(30) Foreign Application Priority Data

May 25, 2004   (JP)   ............................. 2004-154371

(51) Int. Cl.
H02M 5/42 (2006.01)
H02M 3/335 (2006.01)
H02J 1/02 (2006.01)
G05F 1/70 (2006.01)
H01M 10/44 (2006.01)
H01M 2/38 (2006.01)
H01M 2/24 (2006.01)
B60K 1/00 (2006.01)

(52) U.S. Cl. .............................. 363/98; 363/17; 363/39; 363/132; 323/211; 429/50; 429/51; 429/153; 180/65.1

(58) Field of Classification Search ................. 323/211; 363/17, 39, 98, 132; 429/50, 51, 153; 180/65.1–65.4
See application file for complete search history.

(56) References Cited

U.S. PATENT DOCUMENTS

| | | | | |
|---|---|---|---|---|
| 5,332,970 A | * | 7/1994 | El-Hamamsy et al. | ....... 324/414 |
| 5,593,797 A | * | 1/1997 | Brecht | ......................... 429/210 |
| 5,759,712 A | * | 6/1998 | Hockaday | ..................... 429/30 |
| 5,865,860 A | * | 2/1999 | Delnick | ..................... 29/623.5 |

FOREIGN PATENT DOCUMENTS

| | | |
|---|---|---|
| JP | 2003-009541 A | 1/2003 |
| JP | 2003-255012 A | 9/2003 |

\* cited by examiner

Primary Examiner—Akm E Ullah
Assistant Examiner—Jue Zhang
(74) Attorney, Agent, or Firm—McDermott Will & Emery LLP

(57) ABSTRACT

A inverter has a switching device for switching DC to change it to AC, and a bipolar type rechargeable battery connected to the switching device in parallel or in series for smoothing the current from the switching device.

3 Claims, 13 Drawing Sheets

INVERTER AND A DRIVE SYSTEM USING THE INVERTER

BACKGROUND OF THE INVENTION

1. Field of the Invention

The invention relates to an inverter and a drive system using the inverter.

2. Description of the Related Art

Introduction of electric vehicles (EV), hybrid electric vehicles (HEV), and fuel cell vehicles (FCV) has been actively pursued in recent years due to heightening concerns over environmental problems. In the meanwhile, various types of rechargeable batteries are being developed as the source of electric power for the motors used on these vehicles.

The DC provided by a typical rechargeable battery, i.e., motor-driving battery, is seldom supplied to a motor directly, but rather is changed to AC and its voltage is often raised to a higher voltage before it is delivered to an AC motor to drive it. An inverter is used to change the DC from a rechargeable battery to AC.

The inverter of related art changes the DC from a rechargeable battery to AC typically by chopping the DC with a switching device. Typical inverters of prior art such as those disclosed by the Unexamined Patent Publications 2003-009541 and 2003-255012 use devices such as smoothing capacitors in order to suppress ripple currents that develop during the process of changing DC to AC.

SUMMARY OF THE INVENTION

A common problem with the inverters of prior art was that the size of smoothing means such as smoothing capacitors is too large when they are used in supplying powers to motors that drive electric vehicles such as electric vehicles, hybrid electric vehicles, and fuel cell vehicles. It consequently causes severe restrictions on the layout of various components and equipment of vehicles, so that minimization of the size of the smoothing means is highly desired.

An object of the present invention is to provide a compact inverter.

Another object of the present invention is to provide a drive system using the compact inverter for driving loads such as a motor.

The inverter of the present invention has: a switching device for switching DC to change it to AC; and a bipolar type rechargeable battery connected to said switching device in parallel or in series for smoothing the current from said switching device.

Also, the drive system of the present invention is a drive system that provides an inverter connected with a load, changes a direct current to an alternating current and supplies said alternating current to said load, said inverter having: a switching device for changing a direct current to an alternating current by means of switching; and a bipolar rechargeable battery connected to said switching device in parallel or in series for smoothing a current from said switching device.

DETAILED DESCRIPTION OF THE PREFERRED EMBODIMENT

The embodiments of this invention will be described below with reference to the accompanying drawings.

First Embodiment

The first embodiment is an inverter wherein a bipolar type rechargeable battery is used as the smoothing means of the inverter circuit.

Figure 1:
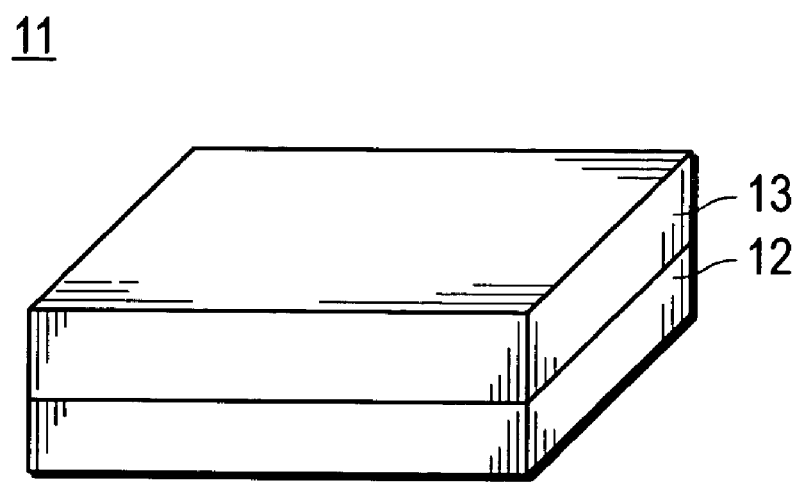
FIG. 1 is a perspective view showing a schematic constitution of an inverter according to a first embodiment.
Figure 2:
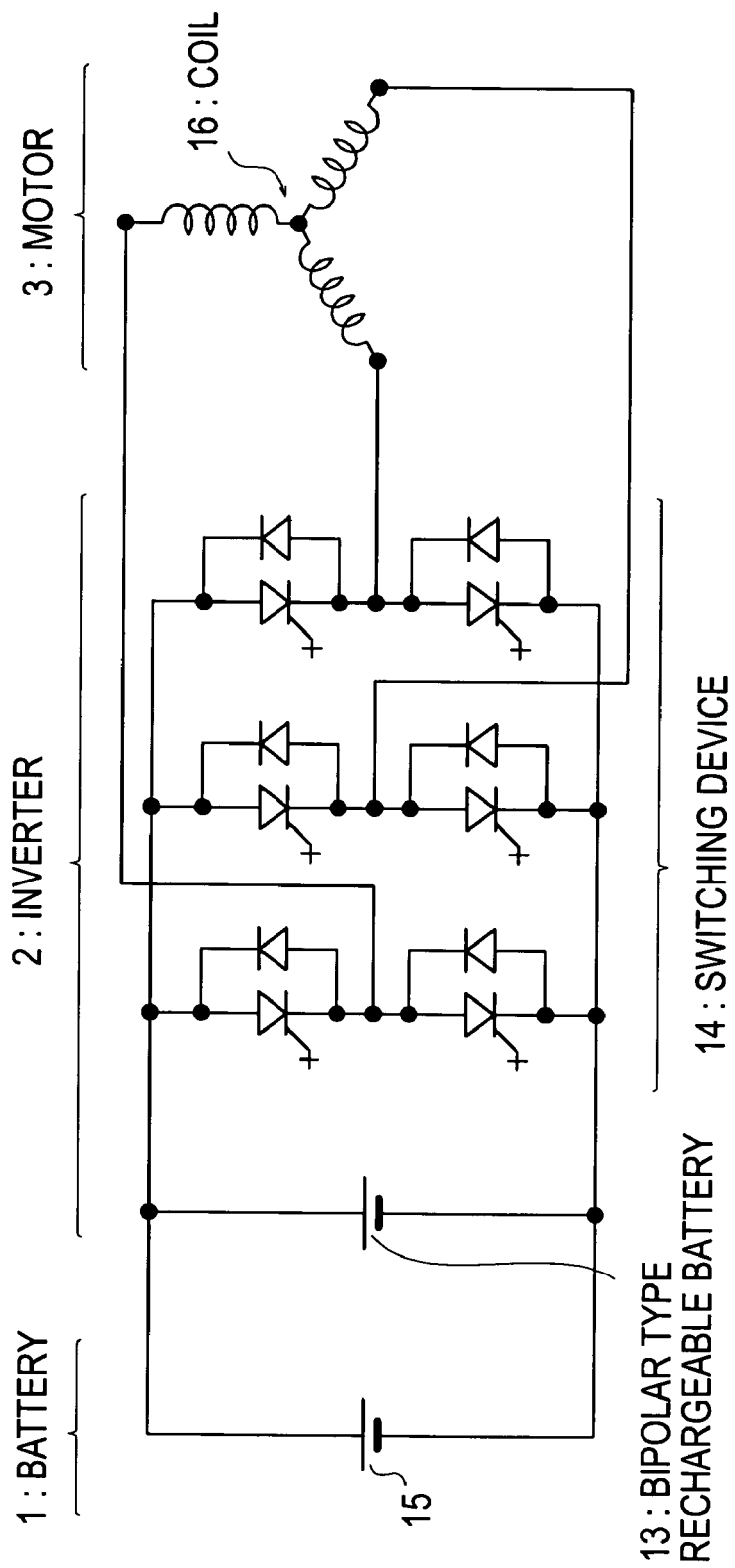
FIG. 2 is a circuit diagram of said inverter being used for a drive system of an electric vehicle.

FIG. 1 is a perspective view showing a schematic constitution of the inverter according to the first embodiment, and FIG. 2 is a circuit diagram of said inverter being used for a drive system of an electric vehicle.

An inverter 11 consists of a case 12 for enclosing a switching device that constitutes the inverter circuit and bipolar type rechargeable batteries 13 mounted at least on one plane of the case 12.

The circuit constitution of the entire drive system consists of a battery portion 1, which is a power source, an inverter portion 2, and a motor portion 3, which is a load, as shown in FIG. 2. Of these components, the inverter portion 2 consists of the inverter 11 in the present embodiment.

The battery portion 1 is essentially consists of a rechargeable battery 15. The rechargeable battery 15 is connected to an inverter 11 in parallel and an AC power is supplied from the inverter 11 to a coil 16 of the motor, which is the load.

The inverter 11 is, as is well known, consists of a plurality of switching devices 14 that changes a current from a DC power source such as the rechargeable battery 15 by repetitive on/off switching actions and a smoothing means for smoothing the current. The switching devices 14 consist of, for example, a plurality of thyristors, transistors, or IGBT (Insulated Gate Bipolar Transistors). Since the constitution of an inverter circuit consisting of a plurality of switching elements is well known, its description is omitted here.

The AC power (three phase AC in this case) obtained from the switching devices 14 is supplied to the coil 16 of an AC motor.

Although the AC power obtained from the inverter 11 is supplied to the motor 3, it can be so arranged alternatively to raise the voltage by feeding the AC from the inverter 11 to a voltage raising circuit (not shown).

The inverter 11 here is equipped with a smoothing means and the bipolar type rechargeable batteries 13 are used as the smoothing means in this case.

Figure 3:
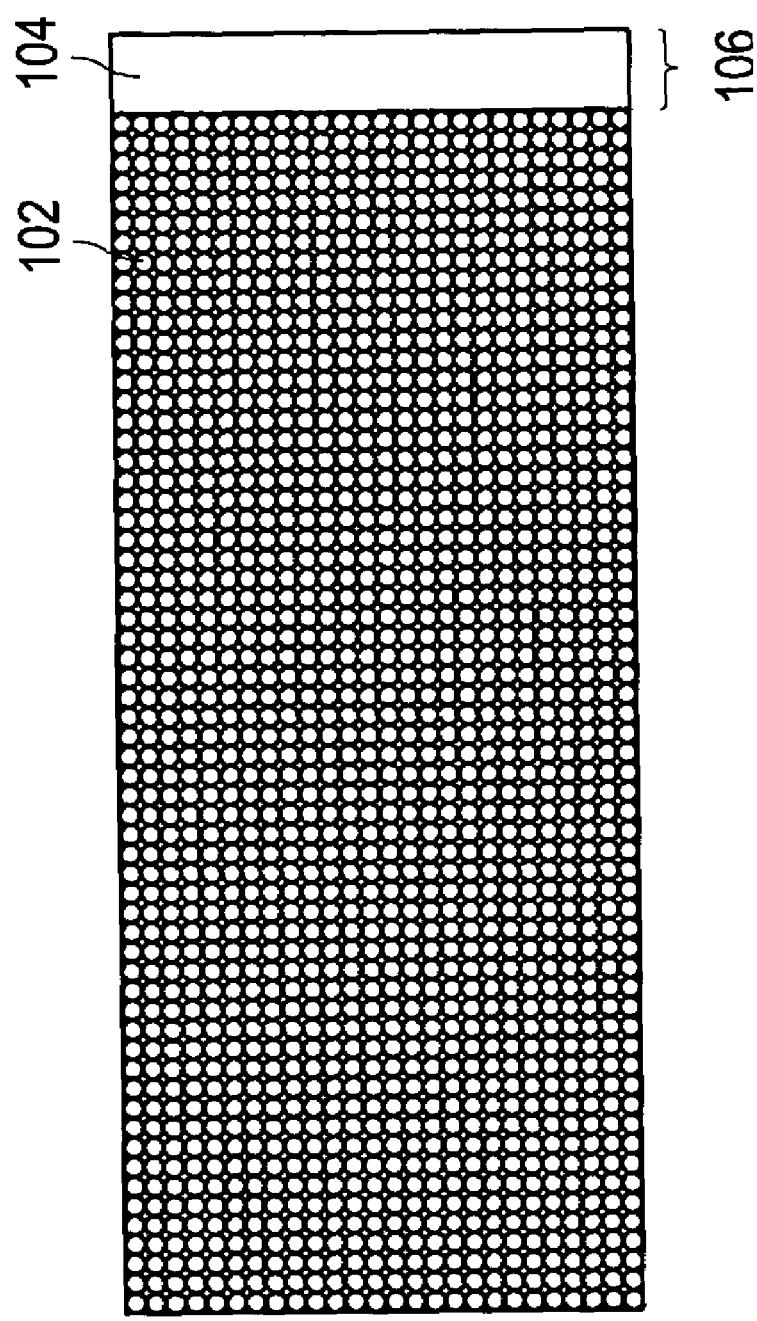
FIG. 3 is a plan view showing an electrode layer on an collector.

The bipolar type rechargeable battery 13 has an electrode layer 102, which contains an active material and serves as an electrode, provided on top of a collector 104 as shown in FIG. 3. The electrode surface is defined as a part where the collector 104 and the electrode layer 102 are laid one on top of the other. The maximum thickness of the electrode layer is less than 105% of the minimum thickness of the electrode surface.

The electrode layer 102 is formed by the inkjet method. In other words, the inverter 11 is equipped with a switching device 14 for changing DC into AC, and a bipolar type rechargeable battery having an electrode formed by the inkjet method provided for smoothing the current from the switching devices 14.

FIG. 3 is a view exaggerated for ease of understanding the invention. Although the drawing shows the electrode layer 102 to consist of numerous particles ejected from an inkjet system as if to suggest that those particles are adhering with each other to form the electrode 102, the electrode layer 102 can be identified as a single layer when viewed by naked eyes.

The electrode is enclosed in an enclosure material, while a positive tab and a negative tab are exposed on the outside of the enclosure material. In laying out the electrode layer 102 on the collector 104, a portion 106 of the outer surface of the collector 104 can be left without being covered by the electrode layer 102 (hereinafter called "uncoated portion") in order to make the tub contact with the collector 104. Although the uncoated portion can exist for purposes other than connecting the tabs, but an excessive amount of uncoated portion will invite the reduction of energy density of the battery. Therefore, it is preferable to minimize the size of the uncoated portion beyond the needs for the tab connection. However, this is not to prohibit the existence of an uncoated portion that arises inevitably as a result of the manufacturing process.

It has been customary to use a coater such as a roll type coating machine for forming the electrode layer. However, it has been impossible to form a uniform electrode layer with a thickness below a certain level using a known coater. Speaking of the thickness of the electrode layer, the process using a coating machine tends to create a certain area where no film is formed if the intended thickness of coating is thinner than a certain level. Speaking of the uniformity of the thickness of the coating, the coating thickness tends to be thicker on the edges of the coated film when a coating machine is used to form an electrode layer. In other words, the process tends to make the coating thickness thicker in the boundary area between the area where the coating is formed and the area where the coating is not formed.

The bipolar type rechargeable battery according to the present embodiment is intended to achieve the requirements realizable with the prior art, i.e., thinness and uniformity of the electrode layer by means of the inkjet method. The inkjet method is a printing method in which liquid ink is ejected from a nozzle to cause the ink to adhere to an object. The inkjet method can be divided into the piezo method, the thermal inkjet method, and the Bubble Jet (product of Canon, Inc.) method depending on the method of ejecting the ink.

The piezo method is to cause the ink to be ejected through a nozzle by deformation of a piezo device, which is provided at the bottom of an ink chamber, caused by electric current. The thermal inkjet method is to cause the ink to be ejected by the steam explosion's energy liberated when the ink vaporizes as the ink is heated by a heater. The Bubble Jet method is identical to the thermal inkjet method in that the ink is ejected by the steam explosion's energy liberated when the ink vaporizes. Although there is a difference in the areas being heated between the thermal ink jet method and the Bubble Jet, the basic principles of the two methods are the same.

The first step of forming an electrode layer using the inkjet method is to prepare the ink for forming the electrode layer. If a positive electrode layer is to be produced, a positive electrode ink containing the constituents of the positive electrode layer must be prepared. If a negative electrode layer is to be produced, a negative electrode ink containing the constituents of the negative electrode layer must be prepared. For example, a positive ink must contain at least some positive active materials. The positive ink may contain an electroconductive material, lithium salt, and a solvent. In order to improve the ion conductivity of the positive electrode, the positive ink must contain a polymerization initiator and a polymer electrolytic material that becomes a polymer electrolyte through polymerization. The method of making an electrode layer by means of the inkjet method will be described in detail later.

Next, a base material for forming the electrode layer is prepared. The member that is placed adjacent to the electrode layer in the battery, e.g., a collector or a solid polymer electrolyte film is used as the base material. The general thickness of a collector is 5-20 $\mu$m. However, a collector with a thickness beyond the abovementioned range can be used as well. The base material is fed to the inkjet device that is capable of printing the electrode ink. The electrode ink is then injected against the base material to cause it to be adhered to the base material using the inkjet method. Since the amount of ink ejected from the nozzle of the inkjet device is a very small amount and the amount of ink ejected can be controlled substantially constant. Therefore, the electrode layer formed by the adherence of the electrode ink is very thin and uniform. Also, the thickness and shape of the electrode layer can be controlled precisely according to the inkjet. In order to form an electrode layer using the conventional coating machine, it is difficult to form an electrode layer with a complex shape. On the other hand, an electrode layer of an arbitrary shape can be formed by simply designing a specific pattern on a computer and simply printing it. The thickness can be controlled by simply repeating the printing process if the thickness of the electrode layer formed by a single printing is insufficient. In other words, the same ink is printed on the same base material repeatedly. By doing so, an electrode layer of a desired thickness can be formed. The thickness of the electrode layer is not limited in particular.

As can be seen from the above, the electrode layer can be formed using the inkjet method, but there is no limitation as to the inkjet method. Therefore, some improvements can be added depending on the type of ink to be used. The inkjet method is a widely popular technology today so that detailed descriptions of the inkjet method are omitted here.

The method of manufacturing an electrode using this inkjet method will be described below.

The first step in the method of manufacturing the electrode using the inkjet method is the preparation of the base material for the electrode layer. A collector or a polymer electrolyte coating can be used as the base material. If it is difficult to supply the base material singularly to the inkjet device, a method of supplying it to the inkjet device by pasting the base material on a medium such as a sheet of paper.

Also, in this manufacturing method, positive ink and negative ink are prepared prior to the printing using the inkjet method. In preparing the polymer electrolyte coating by the ink jet method, electrolyte ink is also prepared.

The ingredients to be included in the positive ink are positive active materials, electro-conductive materials, polymer electrolyte raw materials, lithium salt, polymerization initiation agents, and solvents. The positive ink must contain at least a positive active material. The ion conductivity of the electrode layer of the positive electrode can be improved by polymerization after printing the positive electrode layer using the positive electrode ink containing polymer electrolyte materials such as a macromer of ethylene oxide and propylene oxide and polymerization initiation agents such as benzyl dimethyl ketal. These ingredients are added to the solvent and are agitated well. The solvent does not have to be a specific one but acetonitrile can be used.

The blending ratios of the ingredients contained in the positive electrode ink are not specified. However, the viscosity of the positive electrode ink should be low enough to allow the inkjet method be applied. Lowering of the viscosity can be achieved by increasing the solvent's blending quantity or increasing the positive electrode ink's temperature. However, increasing the solvent's blending quantity excessively reduces the mass of the active substance per unit volume of the electrode layer, so that the solvent's blending quantity should be kept minimum. The lowering of the viscosity can also be achieved by adjusting the polymer electrolyte material and other compounds.

The ingredients to be included in the negative ink are negative active materials, electro-conductive materials, polymer electrolyte raw materials, lithium salt, polymerization initiation agents, and solvents. The negative ink must contain at least a negative negative material. The ion conductivity of the electrode layer of the negative electrode can be improved by polymerization after printing the negative electrode layer using the negative electrode ink containing polymer electrolyte materials such as a macromer of ethylene oxide and propylene oxide and polymerization initiation agents such as benzyl dimethyl ketal. These ingredients are added to the solvent and agitated well. The solvent does not have to be a specific one but acetonitrile can be used.

The blending ratios of the ingredients contained in the negative electrode ink are not specified. Since the description of the blending ratios is the same as the one for the positive ink, it is not repeated here.

The ingredients to be included in the electrolyte ink are polymer electrolyte raw materials, lithium salt, polymerization initiation agents, and solvents. At least the polymer electrolyte raw materials are contained. Any compounds that can form a polymer electrolyte layer by polymerization after the inkjet process can be used as the polymer electrolyte. For example, a macromer of ethylene oxide and propylene oxide is such a compound. These ingredients are added to the solvent and agitated well. The solvent does not have to be a specific one but acetonitrile can be used.

The blending ratios of the ingredients contained in the electrolyte ink are not specified. Since the description of the blending ratios is the same as the one for the positive ink, it is not repeated here. Since a relatively high rate of polymer electrolyte raw materials is contained in the electrolyte ink and polymer electrolyte raw materials tend to increase the ink viscosity, a special attention is required. It goes without saying that the electrolyte ink is not required if the electrolyte contained in the battery being manufactured is liquid.

The viscosity of each ink to be supplied to the ink jet device is not specified but it should preferably be roughly 0.1-50 cP.

The ink is injected to the base material by the ink jet method to form the electrode layer. In forming the electrode layer, the electrode layer's pattern should be determined in advance. A better working efficiency can be achieved by planning in such a way that the electrode layer is formed in accordance with the image prepared on the computer. The process of making a pattern using a computer and manufacturing the electrode layer is identical to forming an image using a computer and printing the image using a printer. Therefore, it is safe to say that the present invention can be applied with relative ease to industrial production as its process can be realized by well-developed expertise in the related industry. The formation of the electrode by the inkjet method is achieved by supplying a collector to the inkjet device and causing an electrode ink, which is a liquid containing an active substance, to be ejected as a large number of droplets to cause them to be adhered to a base material in accordance with a pattern designed in advance.

The ink ejection mechanism to be used by the inkjet device can be either the piezo method, the thermal ink jet method, or the Bubble Jet method. It is preferable to use the piezo method that causes ink particles to be ejected by means of the volumetric change of a piezo electric device.

The volume of the particle ejected by the inkjet device is preferably in the range of 1-100 pico litter. If the volume of the particle is too small, the vibration attenuation may become insufficient. On the other hand, if the volume of the particle is too large, the vibration attenuation may also become insufficient. The volume of the particles ejected by the inkjet device is substantially uniform so that the electrode and the battery made this way have high uniformities.

If the coating thickness of the electrode layer formed by a single coating of particles using the inkjet device is insufficient, it is possible to increase the electrode layer's thickness by coating the same place with the particles more than once. The "same place" means the same area as the area where the electrode layer is formed by means of the first printing process with the inkjet device. In other words, it is an overlaying process using the same material. Laminating an electrode layer with such a technique makes it possible to increase the thickness of the electrode maintaining a uniform thickness. Since the ink jet method generates an electrode layer with a very high uniformity, the same high uniformity is maintained even after multiple laminations.

After the electrode layer is formed, the solvent is removed by drying. If a polymer electrolyte raw material is blended, a polymerization process can be conducted in order to form a polymer electrolyte. For example, if a photopolymerization initiating agent is blended, polymerization can be initiated by irradiating it with ultraviolet rays. This completes an electrode.

Such a process for manufacturing electrodes varies with the type of batteries to be manufactured in the end. For example, in case of manufacturing a lithium ion battery having a liquid electrode between positive and negative electrodes which are enclosed in an enclosure material, the positive and negative electrodes can be manufactured as described above. In manufacturing an all-solid bipolar type rechargeable battery, the positive electrode layer, the polymer electrolyte coating, and the negative electrode layer are formed in that sequence on the base material, i.e., the collector, by the inkjet method. By repeating this process as needed, an all-solid bipolar type rechargeable battery with multiple layers is completed. In this case, the ink-jet method is used for forming the positive electrode layer, the polymer electrolyte coating, and the negative electrode layer.

In an industrial production process, it is possible to manufacture electrodes much larger than the final battery size and cut it to pieces of a desired size in order to improve productivity.

As a manufacturing method of electrodes, it can consist of a process of forming a negative electrode layer by the inkjet method wherein a liquid containing a negative electrode active substance is ejected as a large number of droplets, and a process of forming a positive electrode layer by the inkjet method wherein a liquid containing a positive electrode active substance is ejected as a large number of droplets. In this case, the order of process is not specified as long as the positive electrode layer and the negative electrode layer are formed by the ink jet method. In other words, the negative electrode layer can be formed after the positive electrode layer is formed, or vice versa. It is also possible to manufacture the battery to form the electrodes separately and cause the two to face each other across the electrolyte after the battery is assembled.

As another method of manufacturing, it can contain a process of forming polymer electrolyte coating by means of the inkjet method wherein a liquid containing a polymerization initiation agent and a polymer electrolyte raw material that forms a polymer electrolyte through a polymerization reaction induced by the polymerization initiation agent is injected as a large number of droplets. Since the polymerization agent and the polymerization electrolyte raw material have been described already, it will not be repeated here.

In the following paragraphs, major effects of such electrodes formed by the inkjet method will be described.

First, the coating thicknesses on the electrode surfaces having electrode layers are very uniform. Therefore, heat generated on the electrode surface becomes quite uniform, and localized deteriorations due to heat are minimized. The bipolar type rechargeable battery using such electrodes also has high durability against vibrations. This high durability against vibrations makes the battery having the electrodes according to the present invention quite suitable for use on applications where vibrations are common such as automobiles. The high durability against vibrations is assumed to be resulting from the uniformity of the coating and microscopic constructions of the electrode layers manufactured by the inkjet method as described below. The uniformity of the coating reduces resonance due to thickness distribution.

Figure 4:
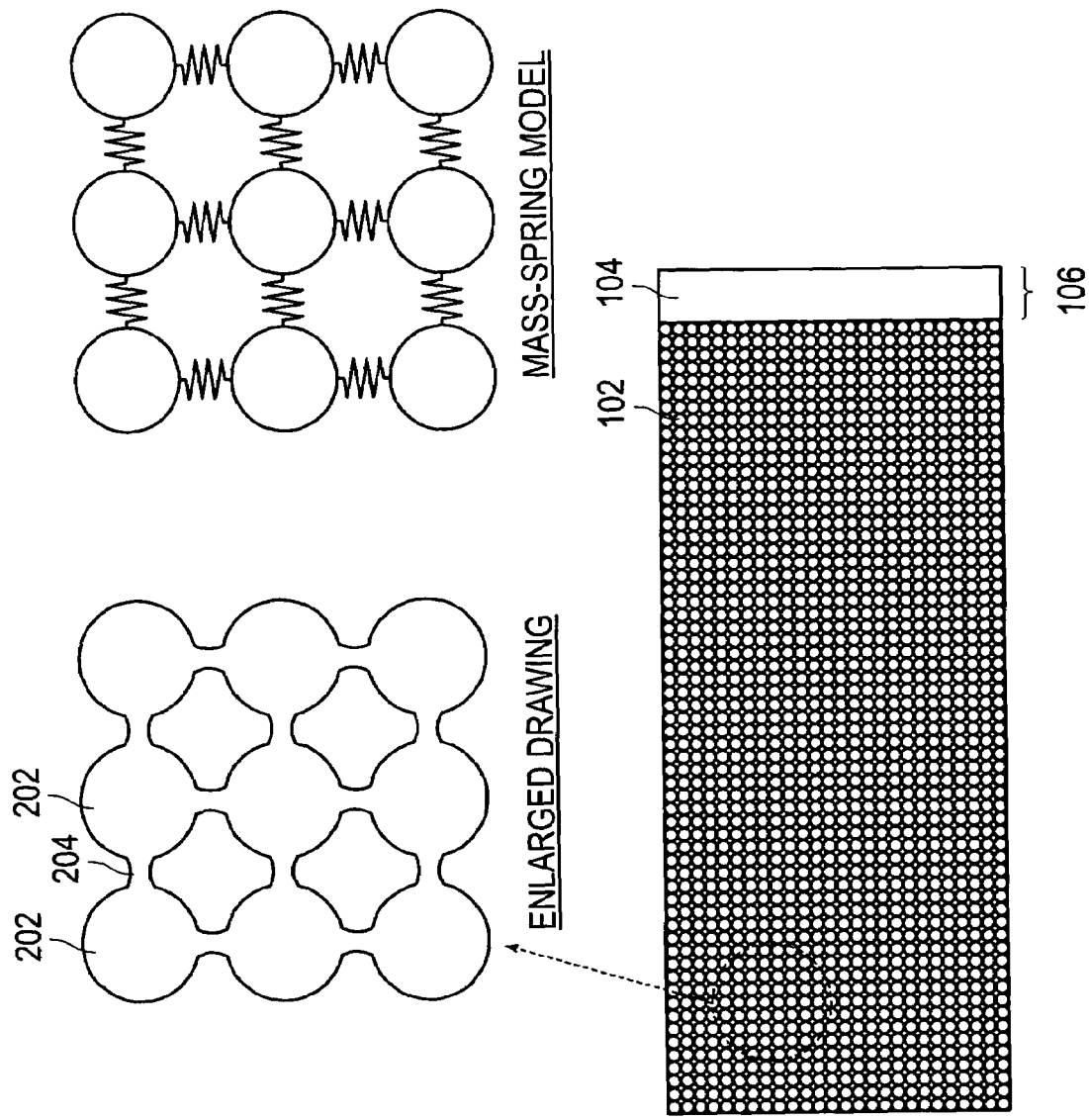
FIG. 4 is a diagram for describing the action of the electrode layer manufactured by the inkjet method.

Moreover, the electrode layer manufactured by the inkjet method consists of a large number of dots 202 formed by the electrode ink adhered to the base surface as shown in FIG. 4. The dots 202 are connected by means of surface tensions on the boundary surface with the adjacent dots 202. In such a microscopic construction, each dot 202 acts as a mass member and its connecting area 204 that connects with an adjacent dot acts as a spring, thus are constituting as a whole a "mass-spring model" as shown in the drawing. The durability against vibrations seems to result from the mass-spring model graphically shown here.

Next, the thickness and flatness of such electrodes formed by the inkjet method will be described.

The average thickness of the electrode surface of an electrode formed by the ink jet method is 5-300 µm. An electrode with such an average thickness and an excellent flatness can be manufactured by forming electrode surfaces using the inkjet method. The electrode surface can be defined as an area where the collector and the electrode layer are laminated. In FIG. 3, the area where the electrode layer 102 is formed on the collector 104 is the electrode surface. If the electrode layer is formed on both sides of the collector, the total thickness of one collector and two layers of electrode layers corresponds to the thickness of the electrode surface. In case of an electrode having the electrode layer formed only on one side of the collector, the average thickness of the electrode surface is preferably 6-120 µm. In case of an electrode having the electrode layer formed on both sides of the collector, the average thickness of the electrode surface is preferably 7-300 µm.

Although the area of the electrode surface is not specified, it can be said in general that the wider the area of the electrode, the more difficult it will be to maintain the uniformity of the electrode surface. From this point of view, it is more useful if the area of the electrode surface is larger than 50 $cm^2$.

Moreover, this electrode is extremely flat despite such an average thickness, and the maximum thickness of the electrode surface is less than 105% of the minimum thickness of the electrode surface. Such flatness minimizes the fluctuation of heating and makes the battery life longer. Moreover, it suppresses cracking and breakage of the battery that might be caused by resonances due to the thickness distribution.

The thicknesses of the electrode and the battery can be measured by a micrometer. As an example of measurement procedure for measuring the average thickness measurement, the region to be measured is first divided into 3×3=9 sections. The thicknesses of arbitrary three points in each region are measured and their average is recorded as the thickness of each particular region. The same measurement is conducted for all regions and the total average is calculated. This process is repeated more than 10 times and the overall average is called the average thickness of the electrode surface. In the present patent application, the number of this repetitive process is called the "repetition number N."

The maximum thickness and the minimum thickness of the electrode surface is measured as the thicknesses of the regions where said thickness of the region is maximum and minimum respectively.

In order to determine the average thickness of the electrode surface within 10 mm from the uncoated area where the electrode layer is not laid on the collector, the region in the vicinity of the uncoated area is divided into three regions having the same distance from the uncoated area. In the embodiment as shown in FIG. 3, the electrode layer region within 10 mm from the boundary between the electrode layer 102 and the uncoated area 104 is divided into three regions in such a way as to make one side of each region to be said boundary surface. The thicknesses of arbitrary three points in each region are measured and their average is recorded as the thickness of each particular region. The same measurement is conducted for all regions and the total average is calculated. This process is repeated more than 10 times and the overall average is called the average thickness of the electrode surface within 10 mm from the uncoated area.

In order to adjust the electrode to a specified size after the electrode layer is formed, the electrode is cut out and the problem is that the thickness in the vicinity of the cut area tends to become thinner. Therefore, the thickness in the vicinity of the cut area may be measured as a barometer of the uniformity of the electrode. In that case, the average thickness of the electrode surface within a distance of 10 mm from the cut area is measured in a similar manner as the measurement of the average thickness of the electrode surface within a distance of 10 mm from the uncoated area.

The average thickness of the electrode surface within a distance of 10 mm from the area where the electrode layer is laid on the collector is less than 104% of the average thickness of the electrode in other areas. The area where the electrode layer is not laid on the collector is an area where the electrode is not formed such as the uncoated area 106 shown in FIG. 3. The electrode layer formed on the collector tends to be thicker in the vicinity of the uncoated area. The uncoated area where the electrode layer is not laid on the collector tends to have tabs formed and can develop a resonance due to vibrations applied to the battery if this part becomes too thick, eventually causing the tab to break up from the collector.

The ratio of the standard deviation ($\sigma$) of the thickness of the electrode layer relative to the average thickness (A) of the thickness of the electrode layer, i.e., $\sigma/A$, is preferably less than 3%. Although it was described before that thickness variation can cause the fluctuation of heat generation, the fluctuation of heat generation can be held minimum if the electrode's flatness is such that satisfies the abovementioned value. Such flatness also suppresses vibration resonance as well. This results in a longer battery life.

The electrode can be either a positive or a negative electrode. The electrode layer is preferably formed by the inkjet method in which a liquid containing active substances is injected as a large number of droplets to cause them to be adhered to the specified base material. The specific base material may differ in accordance with the manufacturing process. Informing an electrode layer on a collector, the base material is the collector. If a solid polymer electrolyte is used in the process, it is possible to form the electrode layer on the solid polymer electrolyte and then the collector is placed.

The materials that constitute the electrode such as the collector and the active substance are not specified in this patent application. Known materials appropriate for the purpose can be used. A newly developed material can be used as well. For example, if an electrode is for a lithium battery, Li—Mn group composite oxides such as $LiMn_2O_4$ or Li—Ni group composite oxides such as $LiNiO_2$ can be used as th positive electrode substance. In some cases, a mixture of two or more kinds of positive electrode active substances can be used. Crystal carbon materials of amorphous carbon materials can be used as the negative electrode active substance. Specifically, natural graphite, artificial graphite, carbon black, active charcoal, carbon fiber, cokes, soft carbon, and hard carbon can be used as the negative electrode active substance. In some cases, a mixture of two or more kinds of negative electrode active substances can be used.

The constitution of the electrode layer can be arbitrarily selected depending on the application and is not specified. For example, the positive electrode contains at least a positive electrode active substance within the positive electrode layer. It can also contain electro-conductive materials and lithium salt. In order to improve the ionic conductivity of the positive electrode, it can contain polymer electrolyte in a distributed state. The blending amounts of these substances are not specified. The blending amounts can be determined based on the existing public knowledge.

The application of the inkjet method to the formation of the electrode layer produces a thin and uniform electrode layer as described above.

Another benefit of applying the inkjet method to the formation of the electrode layer is an improvement of manufacturing efficiency. The conventional method of forming the electrode layer using coating machines such as the roll type coating machine necessitates having separate coating machines for the positive electrode and the negative electrode independently, making the production line longer and taking a long time to manufacture the electrodes. In case the inkjet method is applied to forming the electrode layers, a single inkjet line can form not only positive and negative electrode layers but also polymer electrolyte coating if necessary. Moreover, it can produce electrode layers of more accurate patterns compared to the method of prior art. Further, it allows us to modify the design on a computer freely. Therefore, a single inkjet line can produce multiple types of electrode layers and polymer electrolyte coating.

Figure 5:
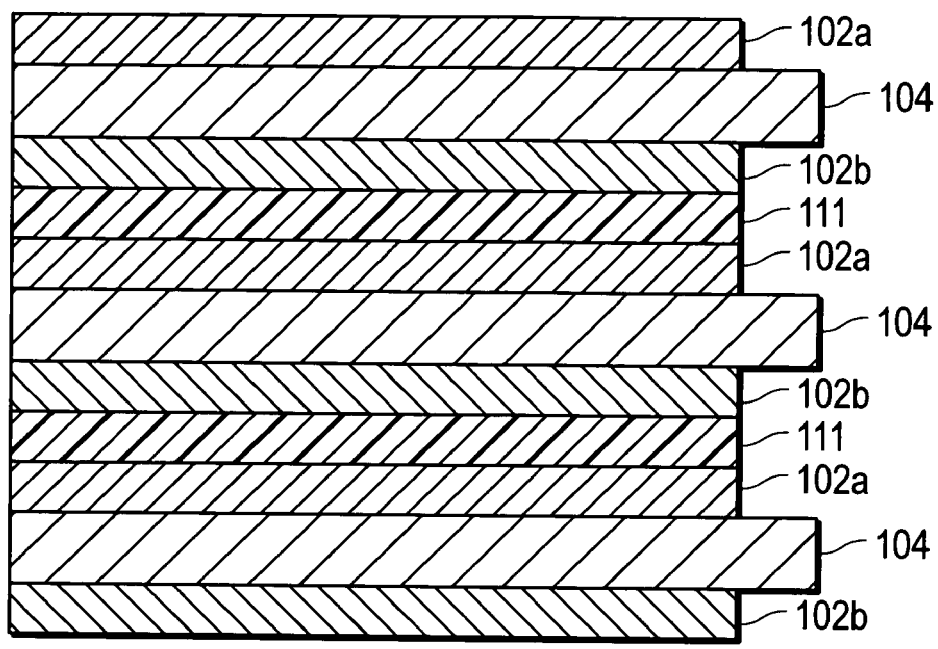
FIG. 5 is a schematic cross-sectional view showing the cross sectional structure of a bipolar type rechargeable battery.

FIG. 5 is a schematic cross-sectional view showing the cross sectional structure of a bipolar type rechargeable battery.

The bipolar type rechargeable battery is a rechargeable battery formed by having an electrolyte layer 111 sandwiched between the electrodes (positive electrode 102a and negative electrode 102b) formed on a collector 104 by the inkjet method as mentioned above. The positive electrode 102a and the negative electrode 102b are formed in the manner described before.

It is preferable to use a solid polymer electrolyte coating as the electrolyte layer 111. A sticky polymer electrolyte is used as the main ingredient of the polymer for the solid polymer electrolyte coating.

For example, polyalkinen oxides such as polyethylene oxide and propylene oxide, acrylonitrile group polymers such as acrylonitrile-butadiene rubber; acrylonitrile group polymers such as acrylonitrile-butadiene-styrene resin, and polyacrylonitrile; and bridged polyether can be used for said purpose. The solid polymer electrolyte coating is formed into a film (including thin plate-like shapes) using those polymers as the main ingredient.

Of these polymers, bridged polyether is the most preferable one. For example, polyethylene oxide (PE) and polypropylene (PO) group polymers as described in J. Electrochem. Soc. 145, 1521-1527 (1998), especially those that are random copolymers of polyethylene oxide and polypropylene oxide bridged by triol, further esterified by unsaturated fatty acid, and then alkoxylated are suitable for the bridged polyether. Partially methylized polyether acrylate is something that can be obtained from such a polyether triol.

Polymers synthesized from raw material monomers having a carbon-carbon dual coupling within a molecule are capable of dissolving lithium salts such as $LiBF_4$ and have strong stickiness and elasticity even after heating and drying to remove the solvent completely, so that they can be formed into thin films.

The solid polymer electrolyte coating is produced by mixing a polymerization initiation agent and a solvent, and then polymerizing the mixture with heating to form thin films. This produces the solid electrolyte coating 11 as the solvent is removed completely. The solid electrolyte coating 11 can contain lithium salt, etc.

As an alternative to forming the electrode on the collector, it is also possible to form a sheet-like solid polymer electrolyte first, next forming an electrode by the inkjet method, and then laminating a collector to produce a rechargeable battery.

Since the inkjet method makes it possible to produce a thin and uniformly flat electrode, it is possible to use this bipolar type rechargeable battery in place of a conventional smoothing capacitor as a smoothing means of the inverter.

If smoothing capacitors are used as smoothing means in the inverter 11 shown in FIG. 2, the smoothing capacitors are required to have a resistance voltage of 650 [V] and a capacitance of 1500 [µF], assuming that the rated voltage of the inverter is 400 [V] and four aluminum electrolytic capacitors are used in parallel, so that the total volume of the four electrolytic aluminum capacitors will be approximately 1206 $cm^3$.

Combining the characteristics and the units of the rechargeable battery, the internal resistance can be calculated from ESR (Equivalent Series Resistance) to be 96 m$\Omega$, in addition to the electrode volume of 1206 $cm^3$ and the capacitance of 0.16 Wh approximately. A rechargeable battery having equivalent characteristics has to have, for example, an approximately comparable resistance assuming that it is capable of producing output of a voltage higher than the rated voltage. In other words, it is necessary to laminate bipolar type rechargeable batteries approximately 100 layers or more, which makes it possible to generate approximately 300-400 [V], thus satisfying the rated voltage. On the other hand, it is necessary to have an internal resistance of approximately 1 mΩ per cell in order to provide the same level of internal resistance.

Next, the specific constitution of a bipolar type rechargeable battery will be shown to achieve the required level of condition of 1 mΩ per cell.

The key factors that determine the internal resistance of the battery are the electric conductivity of the electrolyte, the electric conductivity of the positive electrode layer, the electric conductivity of the negative electrode layer, and the electric conductivity of the collector foil. It is not necessary to consider the increase of the internal resistance due to the direct connections of the cells, as the bipolar type batteries are used in this invention.

The internal resistance per unit area is approximately 2 μm×1667 Ω/cm=0.334 Ω/cm$^2$, assuming that the thickness of the electrolyte layer is 2 μl, as the average value of electric conductivity of the electrolyte portion is approximately 0.6 mS/cm.

Similarly, the internal resistance per unit area is approximately 0.0334 Ω/cm$^2$, assuming that the thickness of the electrolyte layer is 2 μm, as the average value of the electric conductivity is approximately 0.6 mS/cm when a mixture of electrolyte and manganese group composite material or nickel group composite material is used as the positive electrode material.

Similarly, the internal resistance per unit area is approximately 0.0334 Ω/cm$^2$, assuming that the thickness of the electrolyte layer is 2 μm, as the average value of the electric conductivity is approximately 0.6 mS/cm when a mixture of electrolyte and carbon group material is used as the negative electrode material.

As can be seen from the above, when the battery element with a thickness of 6 μm is formed by laminating said positive electrode material, electrolyte, and negative material, the internal resistance per unit area becomes approximately 1 Ω/cm$^2$. The electric conductivity of the collector foil is neglected here as it is negligibly small compared to the electric conductivity of the battery element.

In the present embodiment, the internal resistance per cell is 1 Ω/cm$^2$ when a coin cell with an electrode area of 1 cm$^2$ is made according to the above condition.

The 1 Ω/cm$^2$ cell obtained under the abovementioned condition can be modified to have the resistance of 1 m/cm$^2$ by increasing the area of the electrode surface to 1000 cm$^2$, which can be easily accomplished using the inkjet method.

Moreover, it is possible to prevent the internal resistance from increasing when cells are connected in series by forming these cells as bipolar type, for example, keeping the internal resistance less than 100 mΩ or so when they are laminated 100 layers.

Therefore, the resistance of the bipolar type rechargeable battery can be kept as small as that of the conventional capacitor, and it also can be made compact while providing a sufficient power capacity, thus enabling it to be used as a smoothing means. Its size can be made as small as one-tenth of the smoothing capacitor of Related art.

The thickness of the positive and negative electrodes to be formed by the inkjet method is preferably 2-5 μm. This is because it is preferable to keep the resistance per cell to be 1 mΩ and the thickness of each layer as small as possible from the standpoint of maximizing the output, wherein the minimum thickness being 2 μm in order to prevent short-circuiting of the electrode surface and the area of the electrode surface being roughly 50 cm$^2$, a preferable size from the standpoint of space requirement and handling. It is also effective to use a thickness of 5 μm or so in order to increase the safety against short-circuiting, if it is allowed to have some increase in the resistance value and expand the electrode surface. It is also preferable to choose the electrolyte layer's thickness to be 2-5 μm.

The number of laminations for the bipolar electrode consisting of the positive electrode 102a, the collector 104, and the negative electrode 102b, and the electrolyte layer 111 is preferably 10-100. This is due to the fact that it is necessary to have 100 layers in case of a drive motor of automobile, which requires 200 [V] to 400 [V], assuming the output voltage per layer is 1.5-4.2 [V], while only 10 layers or so may be sufficient if the required motor drive voltage is low.

As can be seen from the above, the rechargeable battery is used for smoothing the current from the switching device in the first embodiment. The present invention thus makes it possible to reduce the installation space requirement in comparison with a capacitor, which has been the smoothing means of prior art. The use of electrodes formed by the inkjet method as the electrodes of the rechargeable battery to be used as the smoothing means especially is effective in reducing the internal resistance, thus making it more suitable as the smoothing means.

The inverter according to the first embodiment provides an inverter having the switching device enclosed in a case and laminating the bipolar rechargeable battery to it as the smoothing means to form an integral unit. Therefore, when it is built into an electric vehicle, it reduces the space that has hitherto been required for the smoothing means and enhances the freedom of component layout within the vehicle. It not only reduces the space requirement but also provides vehicle weight reduction effect as it reduces the weight of the capacitor of the prior art required. Also, it provides an advantage in the cooling performance as it can be installed flatly.

Second Embodiment

The second embodiment of the invention is a drive system in which the bipolar type rechargeable battery, which is the smoothing means of the inverter, is also used as the power source itself. This drive system changes a DC power to a AC power and supplies it to a load such as a motor.

Figure 6:
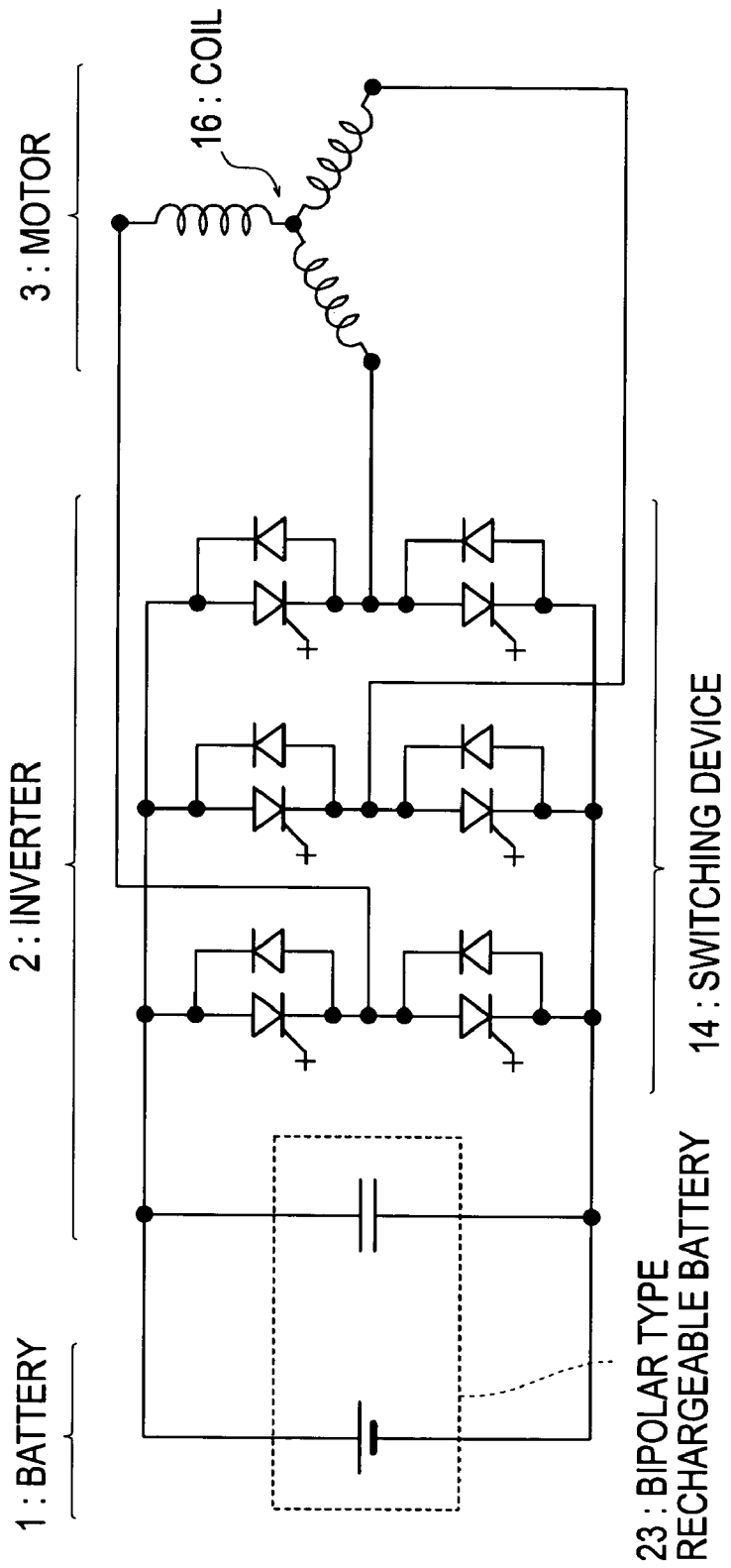
FIG. 6 is a circuit diagram of a drive system according to a second embodiment.

FIG. 6 is a circuit diagram of a drive system according to a second embodiment. The basic constitution is identical to that of the first embodiment having a battery portion 1, an inverter portion 2, and a motor portion 3.

In the second embodiment, a bipolar type rechargeable battery 23 serves as the battery which is a DC power source and also as the smoothing means. Although the power source battery and the smoothing means are indicated separately with a battery-symbol and a capacitance symbol in the drawing, it is for graphically indicating the two functions separately while they are provided by a singly bipolar type rechargeable battery.

The bipolar type rechargeable battery 23 used here is a battery whose electrodes are formed by the inkjet method similar to those in the first embodiment mentioned before. Therefore, detailed descriptions about the structure of the electrodes are not repeated here.

In the bipolar type rechargeable battery 23 used here, the thickness of the positive and negative electrodes formed by the inkjet method is preferably 2-5 μm, the thickness of the electrolytic layer 111 is preferably 2-5 μm, and the number of laminations of the layers consisting of the positive electrode, the electrolytic layer, and the negative electrode layer is preferably 10-100 as in the first embodiment.

As an example, similar to the first embodiment described before, if it is assumed that the collector's thickness is 2 µm, the positive electrode layer's thickness is 2 µm, the solid electrolyte layer's thickness is 2 µm, and the negative electrode layer's thickness is 2 µm, thus the thickness of one cell being 8 µm, and 100 layers of these cells are laminated, a battery with a volume of 100 cm$^3$ (electrode surface: 50 cm$^2$), a resistance value of 96 mΩ (1 mΩ/cell), and a battery capacity of 14 Wh can be obtained. If it is to obtain a rechargeable battery for an electric vehicle with a power capacity of 70 Wh, it can be achieved by connectintg five of the abovementioned bipolar type rechargeable battery with a volume of 100 cm$^3$ connected together. Therefore, it is possible to build into the vehicle the bipolar type rechargeable batteries that serve both as a DC power supply battery and a smoothing capacity requiring only a space of 500 cm$^3$. This is approximately equivalent to the space a conventional battery of an electric vehicle requires, which means the saving of the total space of the smoothing capacitor, substantially reducing the space requirement of the drive system in the vehicle.

Thus, the drive system according to the second embodiment of the present invention reduces the total space requirement substantially. Consequently, it contributes to weight reduction and increase of the freedom in layout of other components on vehicles such as electric vehicles.

Third Embodiment

The third embodiment is an inverter consisting of switching devices with built-in smoothing means wherein each switching device has a built-in bipolar type rechargeable battery.

Figure 7:
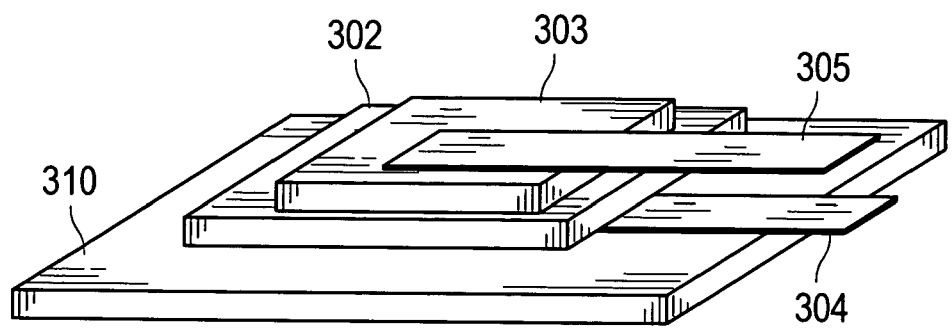
FIG. 7 is a perspective view showing an external constitution of an inverter according to a third embodiment.
Figure 8:
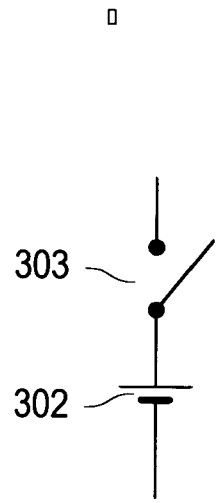
FIG. 8 is a circuit diagram of said inverter.
Figure 9:
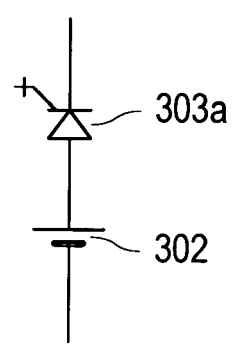
FIG. 9 is a circuit diagram when a thyristor is used as the switching device.

FIG. 7 is a perspective view showing an external constitution of this inverter, FIG. 8 is a circuit diagram of said inverter, and FIG. 9 is a circuit diagram when a thyristor is used as the switching device.

The inverter device 31 has a bipolar type rechargeable battery 302 provided on a substrate 301, and a switching device 303 provided on the bipolar type rechargeable battery 302. The positive electrode of the bipolar type rechargeable battery 302 is connected directly to another electrode of the switching device 303, while leads 304 and 305 extends from the negative electrode of the bipolar type battery 302 and the other electrode of the switching device 303 respectively.

The bipolar type rechargeable battery used here is formed by the inkjet method similar to the bipolar type rechargeable battery of the first embodiment so that detailed description is not repeated here.

The size of the bipolar type rechargeable battery 302 becomes approximately 3-5 L by having 100 layers of collectors each of which consisting of electrodes of 50 cm×50 cm with the thickness of approximately 3 µm (1 µm per cell) if the intended output is 30 kW or so. The internal resistance of such a unit is approximately 0.5 Ω.

An example of the switching device is a thyristor 303a shown in FIG. 9, but a switching device normally used in the inverter such as a transistor can be used as well.

Figure 10:
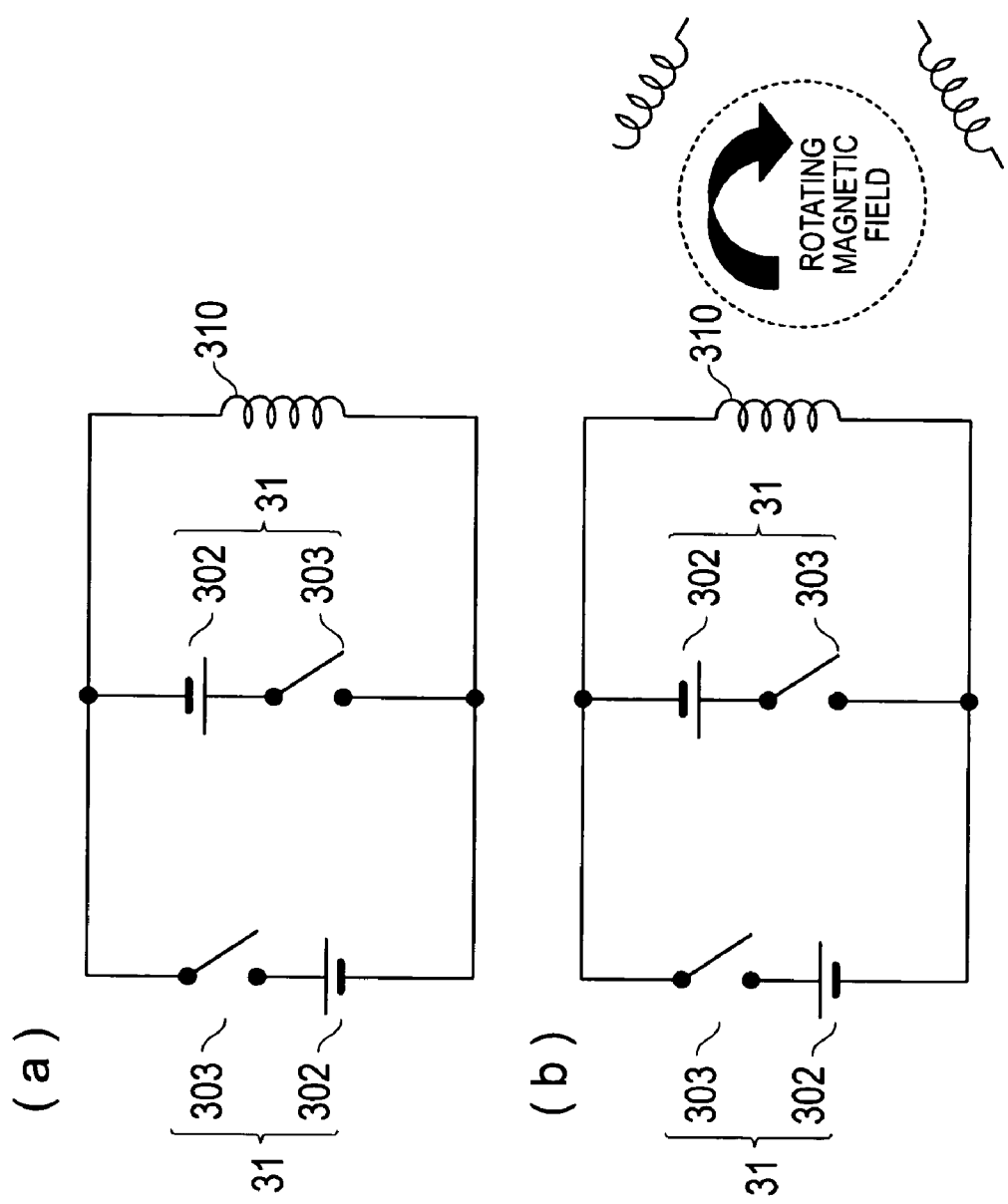
FIG. 10 is a circuit diagram of a drive system including said inverter.

FIG. 10 is a circuit diagram of a drive system using such an inverter 31, which is made integral with a switching device, as the smoothing means. FIG. 10(a) is a diagram showing a coil is connected as a load, while FIG. 10(b) is a diagram showing a case where a three phase AC motor is connected as a load. While FIG. 10(b) shows two inverters 31 connected in parallel to a coil of a three phase AC motor, there are other inverters 31 connected to two other coils of the three phase AC motor, but those inverters 31 connected to the other two coils are not shown in the drawing.

As shown in the diagram, the inverters 31 are connected in such a way that the currents run in opposite directions with each other switching the currents to run through the load reciprocally with the help of the switching devices 303, thus causing an alternating current is supplied to the load 310. The alternating current is smoothed by the bipolar type rechargeable battery of the inverter 31. Therefore, if a three phase AC motor is the load, each coil of the three phases is connected to an inverter 31 respectively.

If such a drive system is to be used on an electric vehicle, two of those 30 kW bipolar type rechargeable batteries will suffice the needs.

By combining the switching devices and the smoothing means consisting of bipolar type rechargeable batteries as an integral unit, the wiring distance between the switching devices and the smoothing means can be practically eliminated, so that the internal resistance of the drive system as a whole as well as any related energy loss can be minimized.

Fourth Embodiment

The fourth embodiment is a drive system identical to the drive system of the third embodiment except that an external power source is added.

Figure 11:
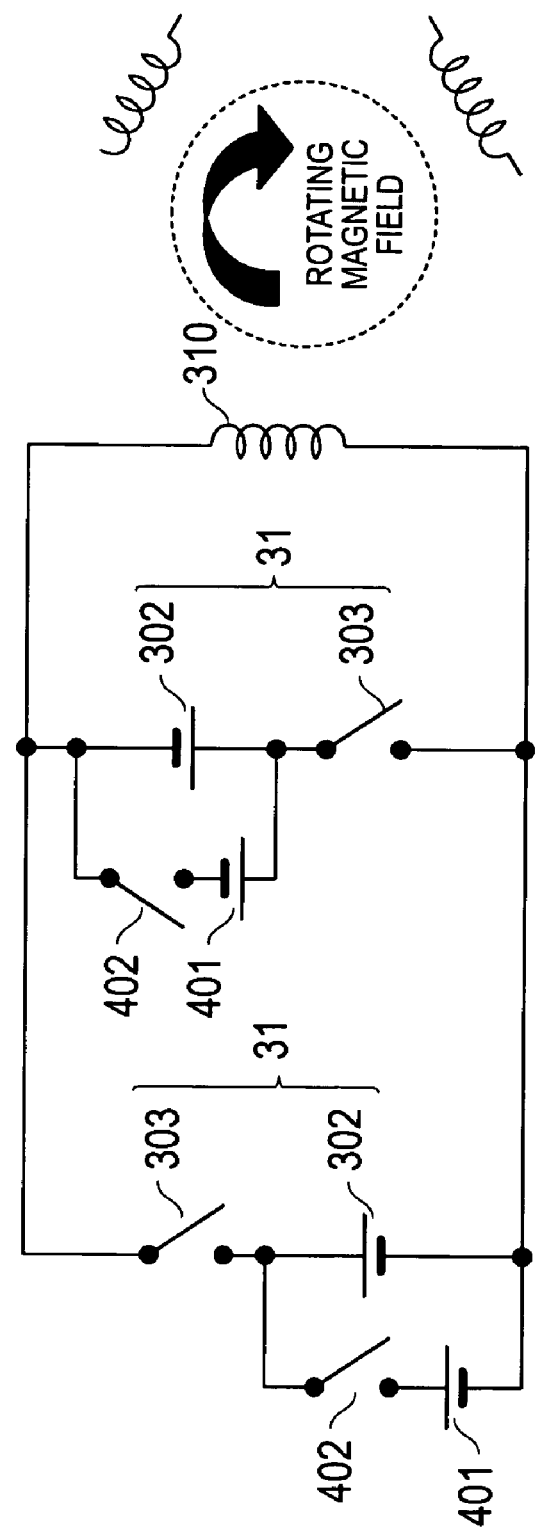
FIG. 11 is a circuit diagram of a drive system according to a fourth embodiment.
Figure 12:
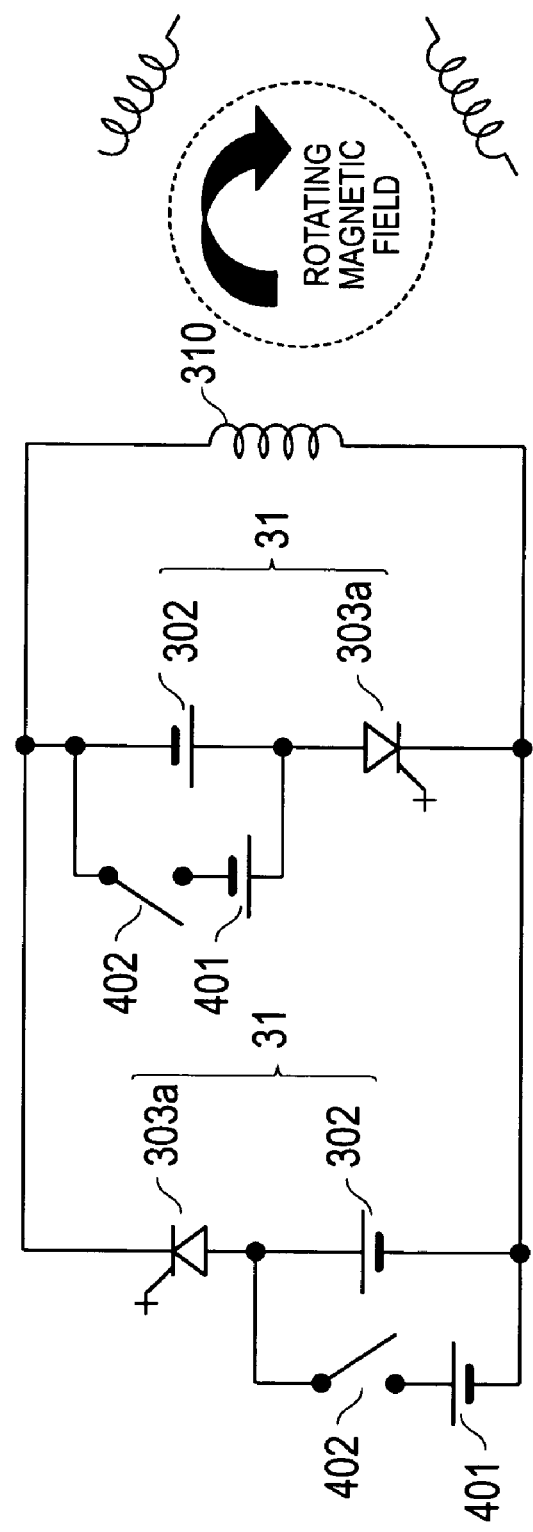
FIG. 12 is a circuit diagram of a drive system wherein a thyristor is used as a switching device.

FIG. 11 is a circuit diagram of a drive system according to the fourth embodiment, and FIG. 12 is a circuit diagram of a drive system wherein a thyristor is used as a switching device.

While FIG. 12 shows a realistic example of the switching device, FIG. 11 will be used for describing the present embodiment.

In the present fourth embodiment, an external power source 401 is provided in addition to the bipolar type rechargeable battery 302 of the inverter 31 of the third embodiment in which the smoothing means is provided integral with the switching device, so that the bipolar type rechargeable battery 302 can be recharged from the outside. The external power source used here is a DC power source.

This makes it possible to use only the bipolar type rechargeable battery 302 as a power source for the load such as a motor, and to recharge it with the external power source 401 when power shortage occurs.

The external power source 401 and the bipolar type rechargeable battery 302 are connected via the switching means 402, and the switching means 402 turns on to recharge the bipolar type rechargeable battery 302 when the power of the bipolar type rechargeable battery 302 lowers. The switching means 402 can be a control circuit that measures the voltage of the bipolar type rechargeable battery 302 and connects the external power source 401 to the bipolar type rechargeable battery 302 when the measured voltage becomes lower than a specified value.

By having an external power source provided outside the inverter 31 in order to recharge the bipolar type rechargeable battery 302 inside the inverter 31 when needed, the bipolar type rechargeable battery 302 inside the inverter 31 is allowed to have only a sufficient minimum power capacity to drive the load such as a motor. This makes it possible to use a smaller unit as the inverter 31, for example, so small that it can be built into the motor case. By doing so, the distance between the load, i.e., the motor, and the bipolar type rechargeable battery which supplies power to the load can be minimized so that the power loss in the wiring can be minimized as well.

In case of a battery powered automobile, a large electric power is required only when the vehicle starts or accelerates, while only a fraction of said power is required while the vehicle is cruising at a constant speed, so that it can be arranged to use the power from the external power source while the vehicle is cruising at a constant speed and to use the power from the bipolar type rechargeable battery built into the motor only when the vehicle is starting or accelerating, thus providing a large energy temporarily minimizing power loss. This is a suitable application of such an arrangement as large powers needed for start and acceleration are only for limited lengths of time so that a battery of a relatively small capacity can suffice the needs.

A circuit shown in FIG. 12 is an example of the fourth embodiment where a thyristor 303a is used as the switching device, but it is only a possible arrangement and the invention is not limited to the use of a thyristor 303a as the switching device, but rather other types of switching device can be configured using other conventional switching devices commonly used in inverters such as transistors and IGBT.

While the case shown in the drawing have two inverters 31 connected in parallel to a coil of a three phase AC motor, there are other inverters 31 connected to two other coils of the three phase AC motor, but those inverters 51 connected to the other two coils are not shown in the drawing.

Also, although FIG. 11 and FIG. 12 shows one external power source is connected to each bipolar rechargeable battery, it is not necessary to have an external power source dedicated to each bipolar rechargeable battery, but rather it is also possible to arrange in such a way as to have multiple bipolar rechargeable batteries recharged by a single external power source.

Fifth Embodiment

The fifth embodiment is an inverter wherein each switching device of the inverter is connected to a bipolar type rechargeable battery in parallel.

Figure 13:
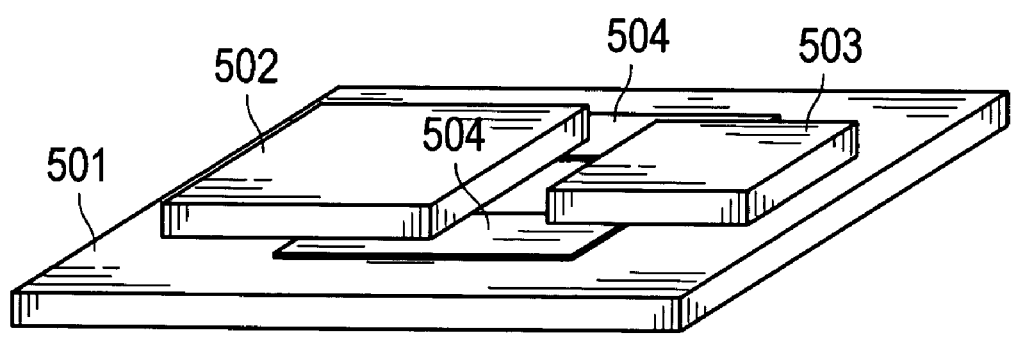
FIG. 13 is a perspective view showing an external constitution of an inverter according to a fifth embodiment.
Figure 14:
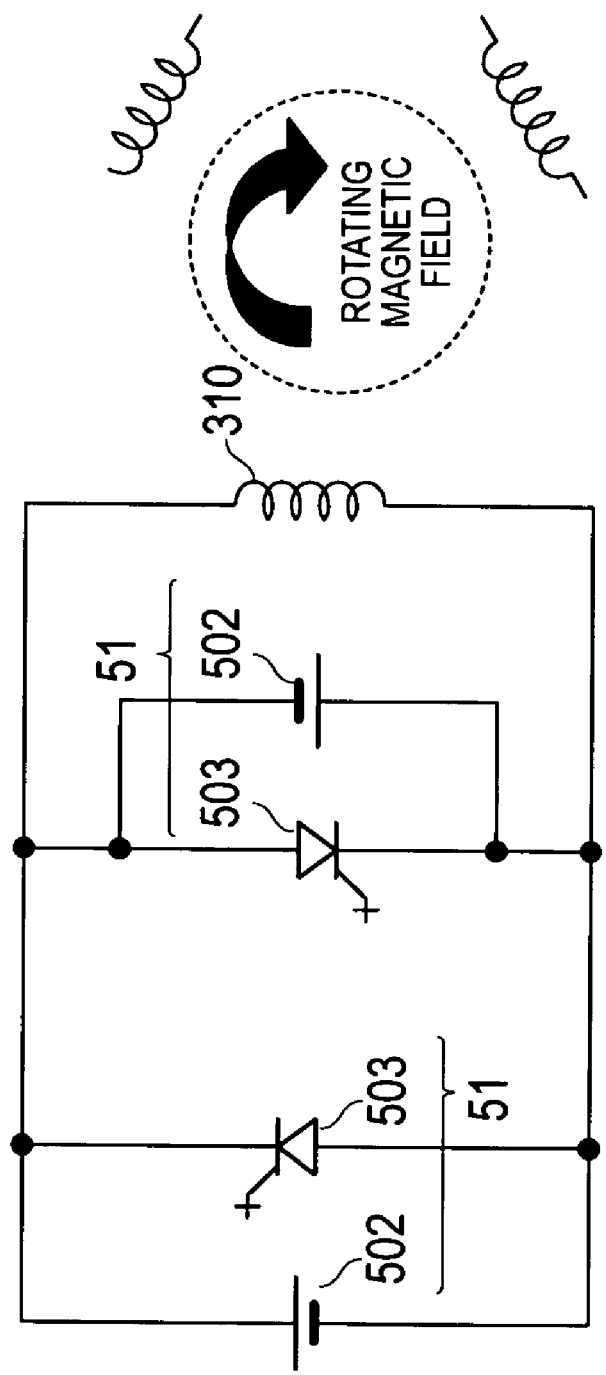
FIG. 14 is a circuit diagram showing a drive system including said inverter.

FIG. 13 is a perspective view showing an external constitution of this inverter and FIG. 14 is a circuit diagram showing a drive system including said inverter. FIG. 14 shows a case wherein a thyristor is used as the switching device of the inverter.

This inverter has a bipolar type rechargeable battery 502 and a switching device 503, which are provided on a substrate 501 and are connected in parallel by a wire 504. The bipolar type rechargeable battery 502 used here is formed by the inkjet method similar to the bipolar type rechargeable battery of the first embodiment so that detailed description is not repeated here.

The constitution of the drive system using this inverter is such as shown in FIG. 14 that two sets of inverter 51 are connected to each coil of a three phase AC motor, i.e., the load.

While the case shown in the drawing have two inverters 51 connected in parallel to a coil of a three phase AC motor, there are other inverters 51 connected to two other coils of the three phase AC motor, but those inverters 51 connected to the other two coils are not shown in the drawing.

As shown in the drawing, the two inverters 51 are connected to the load in such a way that their currents flow in opposite direction. The switching device 503 is connected to the bipolar type rechargeable battery 502, which serves as the smoothing means, in parallel.

This makes it possible for the bipolar rechargeable battery to act not only as the smoothing means but also the power source to operate the motor, i.e., the load, as well as to store the regenerating energy from the motor.

Sixth Embodiment

The sixth embodiment is a drive system identical to the drive system of the fifth embodiment except that an external power source is added.

Figure 15:
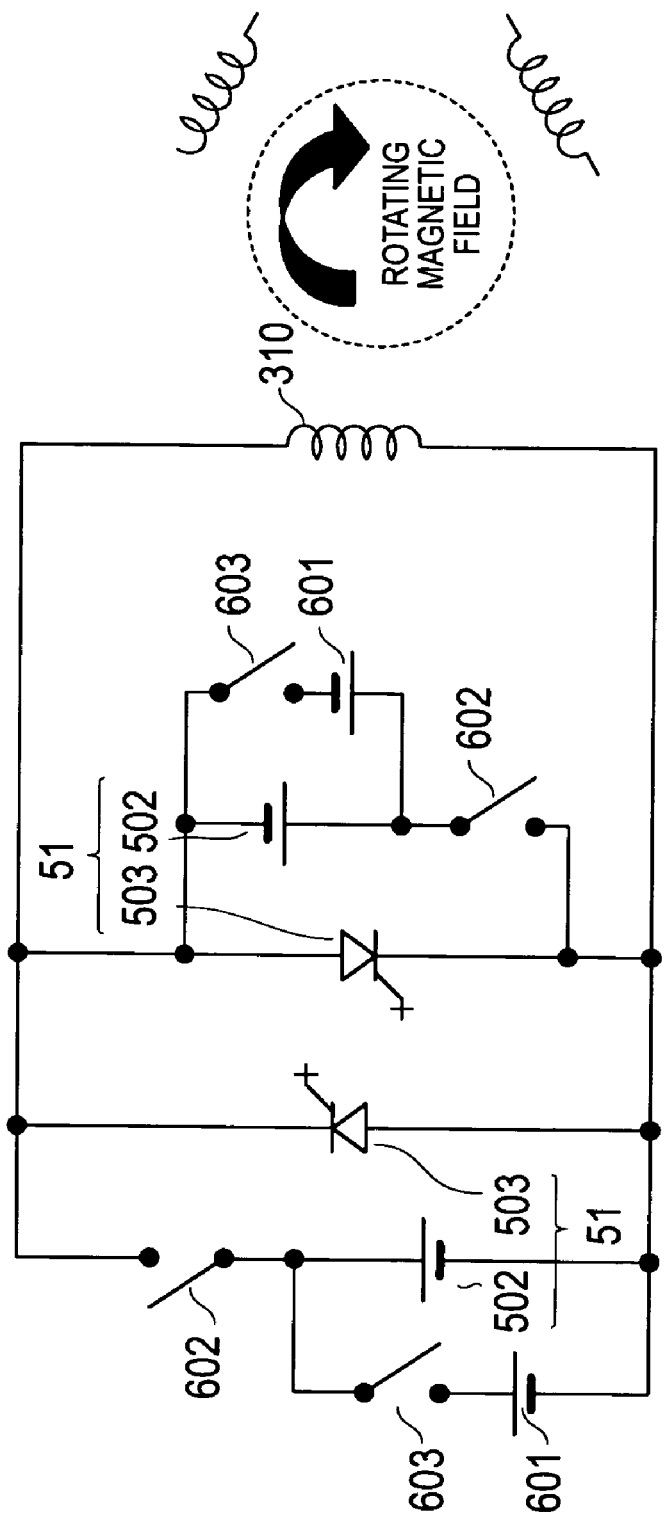
FIG. 15 is a circuit diagram of a drive system according to a sixth embodiment.

FIG. 15 is a circuit diagram of a drive system according to the sixth embodiment.

Recharging from the outside is facilitated by providing an external power source 601 for the bipolar type rechargeable battery 502 that constitutes an inverter 51 as shown in the drawing. A switching device (thyristor as shown) 502 and a bipolar type rechargeable battery 502 are connected in parallel, and the system is provided with a switch 602 for isolating the circuit that functions as the inverter only when it is being recharged by the external power source 601 to prevent the current of the external power source 601 from running through the switching device 502, and a switch 603 for connecting the current from the external power source to the bipolar type rechargeable battery during the recharging cycle.

By having an external power source provided outside the inverter 51 in order to recharge the bipolar type rechargeable battery 502 in the inverter 51 when needed, the bipolar type rechargeable battery 502 can have only a sufficient minimum power capacity to drive the load such as a motor. This makes it possible to use a smaller unit as the inverter 51, for example, so small that it can be built into the motor case. By doing so, the distance between the load, i.e., the motor, and the bipolar type rechargeable battery which supplies power to the load can be minimized so that the power loss in the wiring can be minimized as well. This also contributes to the reduction of energy loss during the collection of regenerating energy by the bipolar type rechargeable battery.

Same as in the fourth embodiment, having an inverter built into the motor case makes it possible when it is used for a battery powered automobile to supply a large power to the motor when during the vehicle's starting or acceleration with a minimum energy loss and also to make an efficient use of regenerative energy during deceleration.

The embodiments described in the above are not to be construed to limit the invention. For example, although the bipolar type rechargeable battery is presented as the smoothing means, the invention is not limited to it and can use any rechargeable battery so long as it is equipped with an electrode formed by the inkjet method. It goes without saying that various other modifications are possible within the scope of the claims of the invention.

The inverter and the drive system according to this invention are suitable for the inverter and the drive system using the same for a vehicle driven by an electric motor such as an electric automobile and a hybrid automobile.

This application is based on Japanese Patent Application No. 2004-154371 filed on May 25, 2004, the contents of which are hereby incorporated by reference.

What is claimed is:

1. A drive system comprising:
   an inverter connected with a load changing a direct current to an alternating current and supplying said alternating current to said load; and
   a battery connected to said inverter as a power source for supplying a direct current to said inverter while the load is operating,
   wherein said inverter comprises:
      a switching device for changing the direct current to an alternating current by means of switching; and
      a bipolar-type rechargeable battery connected to said switching device in parallel or in series for smoothing a current from said switching device, said bipolar type rechargeable battery is mounted closer to said switching device than said battery connected to said inverter, wherein said bipolar-type rechargeable battery comprises:
a positive electrode with a thickness of 2-5 μm and a negative electrode with a thickness of 2-5 μm that constitute said electrode; and
an electrolytic layer with a thickness of 2-5 μm sandwiched between said positive electrode and said negative electrode, wherein
said layer consisting of said positive electrode, said electrolytic layer, and said negative electrode is laminated 10-100 layers.

2. A drive system as claimed in claim 1, wherein said bipolar type rechargeable battery is connected to one of said switching devices in parallel and is recharged by regenerative energy from said load.

3. A drive system as claimed in claim 1, wherein said bipolar type rechargeable battery has an electrode formed by the inkjet method.

* * * * *